United States Patent [19]

Underwood

[11] Patent Number: 4,475,416
[45] Date of Patent: Oct. 9, 1984

[54] CONTINUOUSLY VARIABLE TRANSMISSION DOWN SHIFT CONTROL

[75] Inventor: Herbert N. Underwood, Chicago, Ill.

[73] Assignee: Borg-Warner Corporation, Chicago, Ill.

[21] Appl. No.: 402,408

[22] Filed: Jul. 27, 1982

[51] Int. Cl.³ .................................................. B60K 41/12
[52] U.S. Cl. ........................................ 74/868; 474/12; 474/18; 474/28
[58] Field of Search ................... 74/865, 867, 868; 474/12, 18, 28

[56] References Cited

U.S. PATENT DOCUMENTS

| | | | |
|---|---|---|---|
| 3,043,152 | 7/1962 | Karig et al. | 74/230.17 |
| 3,081,642 | 3/1963 | Emerson | 74/230.17 |
| 3,115,049 | 12/1963 | Moan | 74/865 |
| 3,451,283 | 6/1969 | Rattunde | 474/28 X |
| 3,596,528 | 8/1971 | Dittrich et al. | 74/230.17 F |
| 3,893,344 | 8/1975 | Dantlgraber et al. | 74/230.17 F |
| 3,918,312 | 11/1975 | Espenschied et al. | 74/230.17 F |
| 4,152,947 | 5/1979 | van Deursen et al. | 74/230.17 F |
| 4,369,675 | 1/1983 | van Deursen | 74/868 X |
| 4,387,608 | 6/1983 | Mohl et al. | 74/867 X |

Primary Examiner—Allan D. Herrmann
Assistant Examiner—D. Wright
Attorney, Agent, or Firm—Herman E. Smith

[57] ABSTRACT

A continuously variable transmission of the expansible frusto-conical pulley type having fluid expansion chambers controlling expansion and contraction of the V-groove includes a fluid control circuit having a ratio control pressure regulator valve, a ratio relief valve connected across the ratio control regulator valve, providing for rapid down shift of the pulley combination while maintaining non-slip engagement between pulley discs and a flexible transmission band of trapezoidal cross section.

8 Claims, 3 Drawing Figures

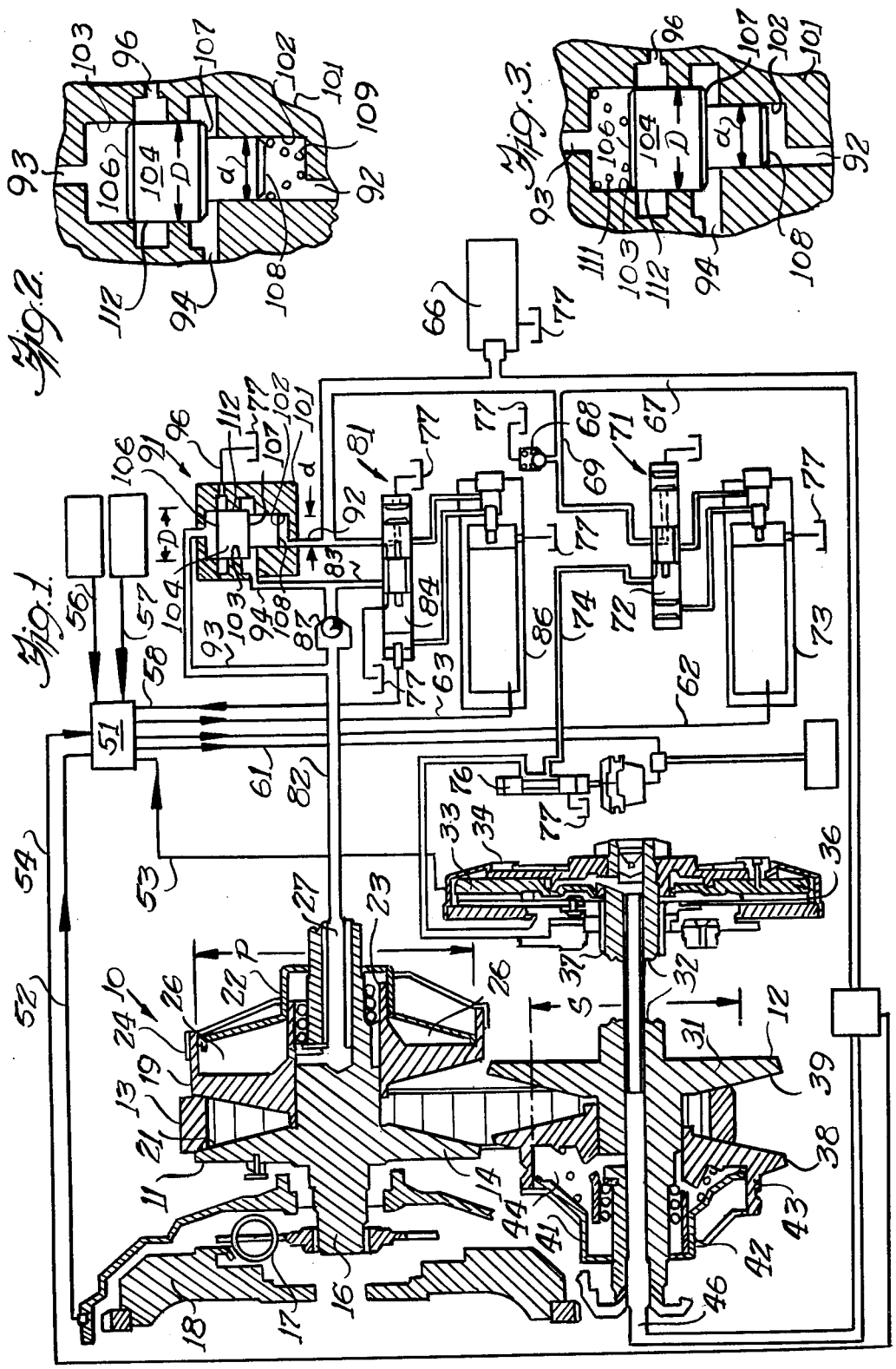

CONTINUOUSLY VARIABLE TRANSMISSION DOWN SHIFT CONTROL

BACKGROUND OF THE INVENTION

1. Field of the Invention

The present invention relates to continuously variable transmissions for transmitting drive from a prime mover such as an internal combustion engine to driven members such as the wheels of a vehicle, and more particularly, relates to means for controlling ratio change in an expansible pulley stepless speed changer.

2. Description of the Prior Art

It is known to provide a continuously variable transmission having primary and secondary variable width V-pulleys having a flexible belt or chain of trapezoidal cross section connecting the pair of pulleys and riding in the V-grooves thereof.

Each pulley includes a pair of frusto-conical disc sheaves facing each other defining a V-groove, one of said disc sheaves being axially fixed with respect to a mounting shaft while the other disc sheave is axially movable for varying the width of the V-groove defined between the discs. The radius of engagement of the flexible belt or chain transmission member with a pulley depends upon the axial position of one disc sheave with respect to the other. The axial position of the movable disc sheave in each pulley is adjustable in order to vary the transmission speed ratio between the pulleys. Fluid expansion chamber devices are connected to the movable disc sheaves such that ratio changes are achieved by regulating fluid flow into and from the expansion chambers. A fluid control circuit is connected to primary and secondary expansion chamber devices for regulating the volume of fluid therein and as a result regulates the width of the V-grooves in the pulleys which in turn determines the speed ratio.

A flexible endless transmission band such as a belt or chain of trapezoidal cross section rides in the V-grooves defined in the pair of pulleys. Where the V-groove is narrow, the transmission band rides high in the groove at larger radius, and where the V-groove is wide, the transmission band rides low in the groove at smaller radius.

In a "LOW" speed ratio condition, the primary pulley has a wide V-groove, short radius of contact with the band, and small volume of fluid in the primary expansion chamber, while at the same time, the secondary pulley has a narrow V-groove, large radius of contact with the band, and large fluid volume in the secondary expansion chamber. The opposite condition occurs for "HIGH" speed ratio.

The speed ratio of the pulleys can be varied from "LOW" to "HIGH" by supplying additional fluid to the primary expansion chamber to increase its volume, while at the same time allowing fluid to exhaust from the secondary expansion chamber to reduce its volume. A down shift from "HIGH" to "LOW" occurs where fluid is exhausted from the primary expansion chamber while additional fluid is supplied to the secondary expansion chamber. During ratio changes, the disc sheaves of a pulley must maintain frictional engagement with the opposite edges of the trapezoidal transmission band in order to avoid slippage. In order to maintain appropriate pinch force on the edges of the trapezoidal transmission band while varying the width of the V-grooves in the pulleys, fluid regulating valves are employed for coordinating the admission and release of fluid into and from the primary and secondary expansion chambers.

In a continuously variable transmission according to the prior art, the primary expansion chamber device is provided with a larger effective piston area than the corresponding effective piston area of the seconddary expansion chamber device. The fluid control circuit includes a torque control pressure regulator valve which controls supply and release of fluid from the secondary expansion chamber device at a pressure selected for applying proper pinch force to the opposite edges of the transmission member depending upon the torque to be transmitted to the driven member and the arc of contact between the flexible transmission bond and the sheaves of the secondary pulley. The regulated fluid pressure supplied to the secondary pulley is supplied to a ratio control pressure regulator valve which regulates supply and release of fluid from the primary expansion chamber device at a pressure appropriate for providing non-slipping pinch engagement between the edges of the flexible belt or chain and the conical sheaves of the primary pulley.

In a continuously variable transmission of the type described above, every intermediate speed ratio must be traversed when changing from one speed ratio to another. This is basically a slow process. On the other hand, in a conventional automatic transmission, a ratio change is accomplished by releasing one clutch or brake and engaging a different clutch or brake. This can be done rapidly.

The down shift can be the most difficult ratio change to achieve in a continuously variable transmission inasmuch as, at times, the down shift must be very fast while at the same time proper belt or chain tension must be maintained. During up shift, the ratio will not change without a proper belt tension condition because the secondary pulley system maintains the tension while the primary pulley system must overcome the forces involved in the secondary pulley. In down shifting, the pressure in the primary pulley system could be dropped too rapidly to such a level that the belt could slip and result in damage to the system.

Thus, it is desirable to provide further improvements in controls for continuously variable transmissions permitting rapid down shift while maintaining appropriate tension on the flexible transmission member.

SUMMARY OF THE INVENTION

In order to provide for rapid down shift of a transmission of the type described above, while maintaining appropriate pinch force on the edges of the transmission band, a ratio relief valve is provided in an arrangement for controlling release of fluid from the primary expansion chamber at a ratio governed by the fluid pressure in the secondary expansion chamber. Thus, slip between the primary pulley and the transmission band is avoided while a down shift from "HIGH" ratio to "LOW" ratio is taking place.

BRIEF DESCRIPTION OF THE DRAWINGS

FIG. 1 is a schematic diagram of a continuously variable transmission and control means therefor including a ratio relief valve;

FIG. 2 is a fragmentary view of another embodiment of ratio relief valve; and

FIG. 3 is a fragmentary view of a further embodiment of ratio relief valve.

DESCRIPTION OF THE PREFERRED EMBODIMENT

Referring now in more detail to the drawing, a continuously variable transmission 10 includes a primary expansible V-pulley 11, a secondary expansible V-pulley 12, and a flexible endless transmission band 13 such as a chain or belt of trapezoidal cross section riding in the V-grooves of the pulleys. For purposes of illustration, each of the pulleys 12 and 13 is shown in both its expanded and contracted conditions with the contracted condition shown above the center line and its expanded condition shown below the center line.

Primary pulley 11 includes an axially fixed frusto-conical disc sheave 14 which is fixed with respect to primary shaft 16 which is connected through a damper 17 to the flywheel 18 of an internal combustion engine (not shown). Primary pulley 11 also includes an axially movable frusto-conical disc sheave 19 which is movable toward and from fixed disc sheave 14 to define a V-groove 21. An axially fixed housing member 22 is telescopically engaged with flanges 23,24 of slidable disc sheave 19 defining a variable volume primary expansion chamber device 26 having an effective piston diameter P. Primary shaft 16 includes a fluid passage 27 communicating with primary expansion chamber 26. As shown above the center of shaft 16, primary expansion chamber 26 is at maximum volume which places movable disc sheave 19 close to fixed disc sheave 14 defining a narrow V-groove 21 causing band 13 to ride high in the groove at a large radius of contact. As shown below the center of shaft 16, primary expansion chamber 26 is at minimum volume with the result that movable disc sheave 19 is spaced further from fixed disc sheave 14 defining a wide V-groove. Movable disc sheave 19 can be adjusted to any intermediate position by adjusting the volume of fluid in primary expansion chamber 26. The trapezoidal cross section transmission band 13 will ride higher or lower in V-groove 21 depending upon the width of the V-groove.

Secondary pulley 12 includes a frusto-conical disc sheave 31 fixed to secondary shaft 32 which is connected to the pressure plate 33 of a clutch 34. Friction disc 36 of clutch 34 is connected to a driven shaft 37.

An axially movable frusto-conical disc sheave 38 is slidably mounted on secondary shaft 32 to move toward and from fixed disc 31 thereby defining a V-groove 39 in secondary pulley 12. A housing 41 is axially fixed to secondary shaft 32 and is telescopically engaged with flanges 42,43 formed on movable disc sheave 38. Housing 41 and slidable disc sheave 38 define a secondary expansion chamber 44. Secondary shaft 32 includes a fluid passage 46 communicating with secondary expansion chamber 44 and with engaging means for clutch 34. Secondary expansion chamber 44 has a smaller effective piston diameter S than the corresponding effective piston diameter P of primary pulley 11. As shown above the center of shaft 32, expansion chamber 44 has large volume which results in a narrow V-groove between discs 31 and 38 while as shown below the center of shaft 32, the expansion chamber 44 has a small volume resulting in a wide V-groove between discs 31 and 38. As shown below the center of shaft 32, the band 13 rides low at short radius of contact in a wide V-groove.

As shown in the drawing, the transmission band 13 is riding high in the V-groove of primary pulley 11 at large radius of contact, and riding low in the groove of secondary pulley 12 at small radius of contact. The secondary shaft 32 thus rotates faster than primary shaft 16. The speed ratio can be varied by controlling the admission and release of fluid to and from expansion chambers 26,44 through the passages 27,46.

As shown in the drawing, the fluid in chambers 26,44 is controlled by a microprocessor 51 though other forms of control could be employed. Microprocessor 51 receives input speed signal over line 52, output speed signal over line 53, system pressure signal over line 54, throttle position signal over line 56, gear selector signal over line 57, and a valve position signal over line 58. The microprocessor 51 provides output signals for clutch lubrication over line 61, for torque control over line 62, and for ratio control over line 63.

Fluid for the expansion chamber 26,44 is supplied by a fluid supply source 66 feeding a system fluid conduit 67 which is connected to passage 46 and expansion chamber 44. The maximum system pressure is limited by pressure relief valve 68 connected to system conduit 67 through conduit 69. The pressure in system conduit 67 is varied by system pressure regulator valve 71. The spool 72 of system regulator valve 72 is pilot controlled by a solenoid valve 73 which receives a control signal from microprocessor 51 over line 62. When spool 72 is shuttled toward the right hand position, the pressure in system conduit 67 increases toward maximum system pressure, however, when spool 72 is shuttled toward the left hand position, fluid is exhausted from system conduit 67 through line 74 and cooling flow valve 76 to sump 77 or by way of clutch 34 to sump 77, thereby reducing pressure in system conduit 67.

It is desirable that the pressure in system conduit 67 and, therefore, expansion chamber 44, be regulated to a level which provides a proper pinch force on the edges of transmission band 13 by the discs 31,38 in view of torque to be transmitted and the arc of contact between the band 13 and pulley 12. The system regulator valve 71 adjusts the system pressure in response to solenoid 73 which in turn is responsive to signals received from microprocessor 51.

A ratio control pressure regulator valve 81 is connected to receive fluid from system conduit 67 and has its output connected to primary chamber 26 through passage 27, and conduits 82,83. Ratio regulator valve 81 includes a pilot operated spool 84 which in turn is controlled by solenoid valve 86. When spool 84 is shuttled toward the right hand position, the system pressure of conduit 67 is conducted through conduit 83, check valve 87, conduit 82 and passage 27 to primary expansion chamber 26. When system pressure is present in both primary expansion chamber 26 and secondary expansion chamber 44, the larger effective piston area of primary expansion chamber 26 will cause contraction of primary pulley 11 by overpowering the secondary expansion chamber 44 through transmission band 13 and pulley 12. Band 13 will then ride high in primary pulley 11 and ride low in secondary pulley 12 as illustrated in the drawing. Thus, in an up shift ratio change, the band is kept in contact with both pulleys because the primary pulley is overpowering the secondary pulley.

In order to achieve down shift while maintaining proper grip between the primary pulley 11 and band 13, the ratio relief valve 91 is connected between system conduit 67 and conduit 82 bridging the ratio regulator valve 81 and check valve 87. Ratio relief valve 91 is connected to system conduit 67 by a conduit 92, is connected to conduit 82 by means of conduit 93 and is connected to conduit 82 by means of conduit 94. A drain 96 to sump 77 is provided.

Ratio relief valve 91 includes a body 101 having a stepped bore 102,103 defined therein. The larger portion of the bore 103 is indicated as having diameter D and communicates with conduit 93, 94 and 96. The smaller portion of the bore 102 is indicated as having diameter d and communicates with conduit 92.

A stepped cylindrical control spool or shuttle member 104 is slidably disposed within stepped bore 102,103 and includes an upper face 106, an annulus or annular face 107, both located in bore portion 103 and a lower face 108 located in bore 102. As shown in FIG. 2, a spring 109 may be located in bore 102 bearing upon lower face 108 urging shuttle member 104 upwardly as viewed in the drawing. On the other hand, as viewed in FIG. 3, a spring 111 may be located in upper bore 103 bearing on face 106 urging shuttle member 104 downwardly. Such springs are not employed in the embodiment of FIG. 1 in which the position and movements of spool 104 are controlled entirely by balancing and rebalancing of fluid pressures exerted on lower face 108, annulus 107 and upper face 106.

It is desirable that the area of upper face 106 of spool 104 be selected in view of the effective piston area of primary expansion chamber 26, while the area of lower face 108 be selected in view of the effective piston area of secondary expansion chamber 44. Where the face areas 106 and 108 are proportional to the effective piston area of the primary and secondary expansion chambers, the spool 104 is considered to be in a neutral fluid balance condition. When it is desired to provide a downward bias on spool 104, the area of face 106 can be increased with respect to the area of face 108, or a spring such as spring 111 of FIG. 3 can be employed. On the other hand, if upward bias of spool 104 is desired, the area of lower face 108 is to be increased with respect to the area of upper face 106, or a bias spring such as spring 109 of FIG. 2 is employed.

The spool or shuttle member 104 tends to move upwardly in bore 102,103 in response to fluid pressure applied to lower face 108 or annular face 107. In an upward position, land 102 of spool 104 seals drain port 96 to prevent exhaust of fluid from conduit 93. The spool 104 tends to move downwardly in bore 102,103 in response to fluid pressure applied to upper face 106. In its downward position, land 112 of spool 104 permits exhaust of fluid from conduit 93 through drain port 96.

OPERATION

The operation of the ratio control regulator valve 81 in cooperation with the ratio relief valve 91 will now be covered in more detail.

The spool 84 of ratio control regulator valve 81 is normally in a stage of exhitation being shuttled between right hand and left hand positions in response to signals received by solenoid valve 86 over line 63 from microprocessor 51. Such operation is sometimes referred to as dither mode of operation. If spool 84 resides in right hand position more than half time, the pulleys 11,12 shift up if spool 84 resides equally in right hand and left hand positions, the ratio of pulley 11,12 should remain unchanged, and if spool 84 resides in left hand position more than half time, the ratio of pulleys 11,12 undergo down shift. One reason for operation of ratio control regulator valve 81 in dither mode even when no pulley ratio change is desired is to maintain the desired volume of fluid in primary expansion chamber 26 despite leakage through seals and the like.

When an upshift is called for, the spool 84 of ratio regulator valve 81 spends more than half its time in right hand position resulting in flow from system conduit 67 through spool 84 into conduit 83. The fluid pressure in conduit 83 is slightly less than the fluid pressure in system conduit 67 so long as flow occurs through spool 84. System pressure from conduit 67 is applied to lower face 108 of ratio relief valve 91, while the slightly reduced pressue in conduit 83 is applied to annulus 107, and to upper face 106 through conduit 93. The area of lower face 108 plus the area of annulus 107 equal the area of upper face 106. Since the slightly reduced pressure is applied to upper face 106 and annulus 107 in opposition to each other while system pressure is applied to face 108, the net force is upward causing land 112 to seal drain 96 which allows fluid to flow into primary expansion chamber 26 to increase its volume.

Once the desired pulley ratio is achieved, the spool 84 of ratio control regulator valve 81 cycles or shuttles equally between right and left hand positions with the result that conduit 83 is alternately charged with fluid and exhausted to sump 77. Since the fluid pressure in conduit 83 is applied to annulus 107 in aid of face 108, the spool 104 of ratio regulator valve will be urged upwardly (closed) when conduit is being filled, and will be urged downwardly (toward open) as conduit 83 is drained. If the area of face 106 bears the same proportion to the effective area of the primary expansion chamber as the area of lower face 108 has with respect to the effective area of the secondary expansion chamber, then spool 104 should not reach the open position where land 112 uncovers port 96. However, if any fluid is lost through drain 96, it is made up in the same way as loss through the seals of the expansion chamber by dither mode operation of spool 84. If desired, spool 104 can be provided with a bias by the use of springs as shown in FIGS. 2 or 3 or by changing the areas of lower face 108 with respect to the area of upper face 106.

When a down shift is called for, the spool 84 of ratio control regulator valve 81 spends more than half its time in left hand position with the result that conduit 83 and annulus 107 are connected to sump more than half the time. The loss of fluid pressure on annulus 107 tends to allow spool 104 to move downwardly in bore 103 such that land 112 uncovers drain port 96 which in turn allows fluid to exhaust from primary expansion chamber 26 through passage 27, and conduits 82,93. However, in a down shift condition, the pressure in system conduit 67 has been increased and is applied to lower face 108 of spool 104 which tends to resist downward movement of spool 104, or force it upwardly.

In order for down shift to occur, the system pressure in conduit 67 is increased to a level which increases the volume of secondary expansion chamber 44 which in turn contracts the disc sheaves 38,39 forcing band 13 to a larger radius of contact with the secondary pulley 12. The band 13, at the same time, spreads the disc sheaves 19,21 of primary pulley 11 forcing fluid out of primary expansion chamber 26 which is applied to upper face 106 of ratio relief valve spool 104. Since the lower face 108 of ratio relief valve spool 104 has system pressure applied to it, the pressure applied to upper face 106 must be high enough to move spool 104 downwardly in order for fluid to exhaust from primary chamber 26 through drain 96. This can only occur where band 13 is tightly engaged with disc sheaves 19,21.

Thus ratio relief valve 91 assures that fluid can be exhausted from primary chamber 26 as rapidly as possible consistant with maintaining non-slipping engagement between band 13 and disc sheaves 19,21 of primary pulley 11. This in turn provides for rapid down shift of the pulley band combination.

I claim:

1. A continuously variable transmission including a primary pulley and a secondary pulley having an endless transmission member of trapezoidal cross section extending around the pair of pulleys, each pulley including an axially fixed and an axially movable conical disc sheave arranged for gripping opposite edges of said transmission member, each pulley having a fluid actuated expansion chamber device urging the pulley sheaves into gripping engagement with the edges of said endless transmission member, the primary expansion chamber device connected to said primary pulley having a greater effective piston area than the corresponding area of the secondary expansion chamber device connected to said secondary pulley, and a fluid circuit connected to said expansion chamber devices including a source of fluid pressure and a system pressure regulator valve, said fluid circuit including system conduit means communicating regulated system pressure to the secondary expansion chamber device, and a ratio control pressure regulator valve connected between said system conduit and said primary expansion chamber device, wherein the improvement comprises a ratio relief valve connected in parallel circuit bridging said ratio control regulator valve, said ratio relief valve including a movable shuttle member having a land arranged for limiting flow through an exhaust port, said shuttle having a first face communicating with said primary expansion chamber device and a second face opposed to said first face communicating with said secondary expansion chamber device, said second face having a smaller area than said first face, said shuttle member including an annular face opposed to said first face, and a one-way check valve disposed between said annular face and said first face.

2. A continuously variable transmission according to claim 1, wherein said annular face is connected to a regulated outlet of said ratio control pressure regulator valve.

3. A continuously variable transmission according to claim 1, wherein the area of said first face of said shuttle member is proportional to the effective area of said primary expansion chamber device, and the area of said second face bears substantially the same proportionality to the effective area of said secondary expansion chamber device.

4. A continuously variable transmission according to claim 1, wherein the area of said first face of said shuttle member is proportional to the effective area of said primary expansion chamber device, and the area of said second face is proportionally larger than the effective area of said secondary expansion chamber device.

5. A continuously variable transmission according to claim 1, wherein the area of said first face of said shuttle member is proportional to the effective area of said primary expansion chamber device, and the area of said second face is proportionally smaller than the effective area of said secondary expansion chamber device.

6. A continuously variable transmission according to claim 1, wherein said ratio relief valve includes a bias spring acting upon said shuttle member bearing upon said first face thereof.

7. A continuously variable transmission according to claim 1, wherein said ratio relief valve includes a bias spring acting upon said shuttle member bearing upon said second face thereof.

8. A continuously variable transmission including primary and secondary expansible frusto-conical V-groove pulleys having an endless flexible transmission member of trapezoidal cross section extending around the pair of pulleys engaged in the V-grooves thereof, each pulley having a fluid actuated expansion chamber device controlling expansion and contraction of the pulley V-groove, and a fluid control circuit communicating with said expansion chamber devices including a ratio control regulator valve, wherein the improvement comprises a ratio relief valve connected in parallel circuit bridging said ratio control regulator valve providing for rapid down shift of the primary-secondary pulley combination while maintaining non-slip engagement between the endless transmission member and the V-grooves of said pulleys.

* * * * *